United States Patent
Ning et al.

(10) Patent No.: US 10,907,719 B2
(45) Date of Patent: Feb. 2, 2021

(54) HYBRID COMPOSITE GEAR WITH ENHANCED STRENGTH AND WEAR RESISTANCE

(71) Applicant: THE UAB RESEARCH FOUNDATION, Birmingham, AL (US)

(72) Inventors: Haibin Ning, Birmingham, AL (US); Uday Vaidya, Birmingham, AL (US); Selvum Pillay, Birmingham, AL (US)

(73) Assignee: THE UAB RESEARCH FOUNDATION, Birmingham, AL (US)

( * ) Notice: Subject to any disclaimer, the term of this patent is extended or adjusted under 35 U.S.C. 154(b) by 317 days.

(21) Appl. No.: 15/772,696

(22) PCT Filed: Nov. 1, 2016

(86) PCT No.: PCT/US2016/059890
§ 371 (c)(1),
(2) Date: May 1, 2018

(87) PCT Pub. No.: WO2017/079147
PCT Pub. Date: May 11, 2017

(65) Prior Publication Data
US 2018/0313442 A1    Nov. 1, 2018

Related U.S. Application Data

(60) Provisional application No. 62/249,596, filed on Nov. 2, 2015.

(51) Int. Cl.
| F16H 55/06 | (2006.01) |
| F16H 55/14 | (2006.01) |
| B29D 15/00 | (2006.01) |
| B29K 101/12 | (2006.01) |
| B29K 105/08 | (2006.01) |

(52) U.S. Cl.
CPC ............. *F16H 55/06* (2013.01); *B29D 15/00* (2013.01); *F16H 55/14* (2013.01); *B29K 2101/12* (2013.01); *B29K 2105/0845* (2013.01); *B29K 2105/0881* (2013.01); *F16H 2055/065* (2013.01)

(58) Field of Classification Search
None
See application file for complete search history.

(56) References Cited

U.S. PATENT DOCUMENTS

| 3,183,734 A * | 5/1965 | Kuntzmann ............ F16H 55/06 74/434 |
| 3,461,737 A | 8/1969 | Lukawich et al. |
| 3,852,400 A * | 12/1974 | Arai ........................ B21H 5/02 264/154 |

(Continued)

OTHER PUBLICATIONS

International Search Report in PCT Application No. PCT/US2016/059890 dated Dec. 29, 2016.

*Primary Examiner* — William Kelleher
*Assistant Examiner* — Gregory T Prather
(74) *Attorney, Agent, or Firm* — Thomas | Horstemeyer, LLP

(57) ABSTRACT

Various examples of methods and apparatuses are provided for a hybrid composite gear. The hybrid composite gear includes a continuous fiber thermoplastic composite material co-molded onto a periphery of a neat thermoplastic or discontinuous fiber thermoplastic gear.

7 Claims, 6 Drawing Sheets

(56) References Cited

U.S. PATENT DOCUMENTS

| | | | | |
|---|---|---|---|---|
| 3,854,418 | A | * | 12/1974 | Bertin .................... F16H 55/06 105/29.1 |
| 5,074,828 | A | * | 12/1991 | Ellis ....................... F16H 55/06 474/161 |
| 9,296,157 | B1 | | 3/2016 | Handschuh et al. |
| 10,267,718 | B2 | * | 4/2019 | Johnson ............... G01M 13/022 |
| 2001/0030381 | A1 | * | 10/2001 | Kobayashi ............ B29C 70/345 264/257 |
| 2002/0112555 | A1 | * | 8/2002 | Chikaraishi ............... F16H 1/16 74/388 PS |
| 2007/0089555 | A1 | | 4/2007 | Tomoda et al. |
| 2009/0214812 | A1 | | 8/2009 | Bartus et al. |
| 2014/0087127 | A1 | * | 3/2014 | Brinkhaus ......... B29C 66/83221 428/116 |
| 2015/0183065 | A1 | * | 7/2015 | Chavdar ................. B21K 1/30 74/460 |
| 2016/0114544 | A1 | * | 4/2016 | Kunishima .......... B29C 70/465 74/460 |
| 2016/0363206 | A1 | * | 12/2016 | Modrzejewski ........ F16H 55/06 |
| 2017/0261087 | A1 | * | 9/2017 | White ................ B23K 15/0086 |
| 2017/0321793 | A1 | * | 11/2017 | Wu ......................... F16H 55/30 |
| 2020/0088284 | A1 | * | 3/2020 | Hahn ..................... F16H 19/001 |

* cited by examiner

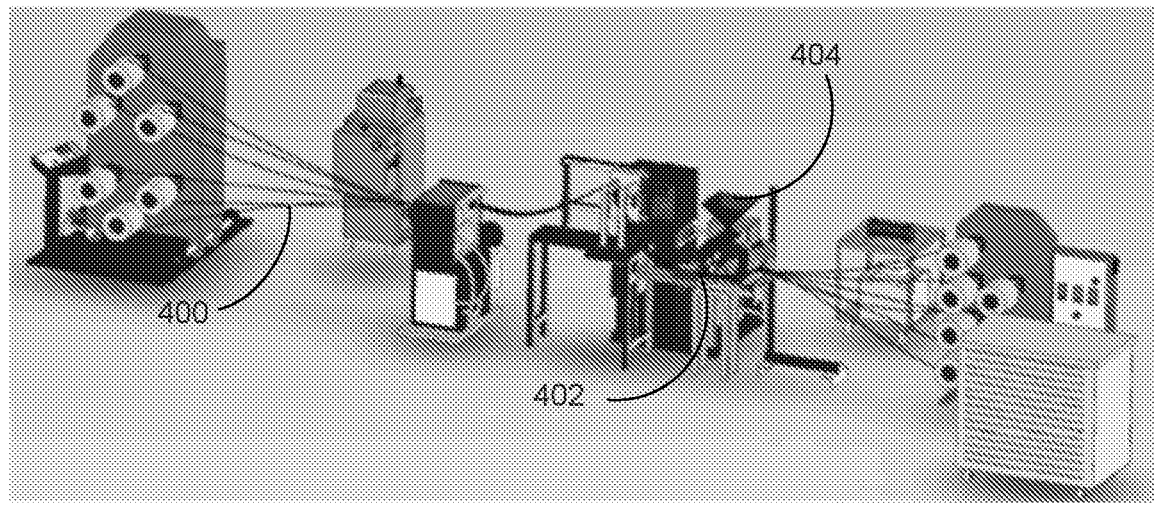
FIG. 4
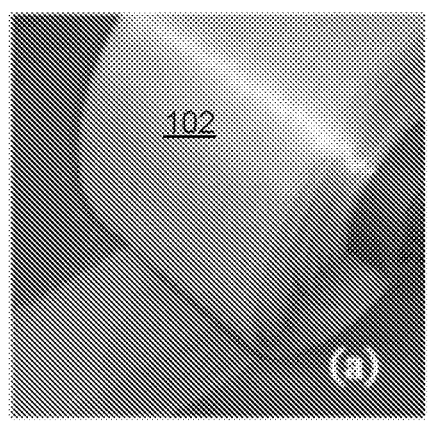 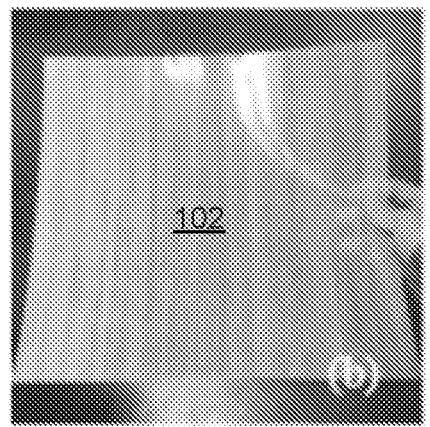
FIG. 5A  FIG. 5B

HYBRID COMPOSITE GEAR WITH ENHANCED STRENGTH AND WEAR RESISTANCE

CROSS-REFERENCE TO RELATED APPLICATION

This application is the 35 U.S.C. § 371 national stage application of PCT Application No. PCT/US2016/059890, filed Nov. 1, 2016, where the PCT claims priority to, and the benefit of, U.S. provisional application entitled "HYBRID COMPOSITE GEAR WITH ENHANCED STRENGTH AND WEAR RESISTANCE" having Ser. No. 62/249,596, filed Nov. 2, 2015, both of which are hereby incorporated by reference in their entireties.

BACKGROUND

There has been a consistent increase in demand for gears in United States for the last decade. With the increasing effort in developing non-metallic gears that are lighter weight, have better damping (less noise) and are more resistance to corrosion, have lower coefficients of friction, and have an ability to run under non-lubricated conditions for applications such as automotive, gears made of neat plastics/discontinuous fiber plastics have gained tremendous interest. The discontinuous fiber plastic gears have been limited in low stress application while metal gears still remain to be the first and main choice for high performance applications.

SUMMARY

Embodiments of the present disclosure are related to high-performance, lightweight, and low-cost hybrid composite gears.

In one embodiment, among others, a hybrid gear comprises a thermoplastic gear and a continuous fiber thermoplastic composite that is co-molded or bonded onto a gear teeth periphery of the thermoplastic gear. Example thermoplastic includes nylon or polyamide, Polytetrafluoroethylene (PTFE), polyoxymethylene (POM), acrylonitrile butadiene styrene (ABS), polyphenylene sulfide, polyetherimide, poly ether ether ketone, poly ether ketone, polypropylene, polyethylene.

In one or more aspects of these embodiments, the continuous fiber comprises carbon fiber or glass fiber or ceramic fiber or organic fibers such as aramid fiber and polyethylene fiber. In one or more aspects of these embodiments, the continuous fiber thermoplastic composite comprises a unidirectional fiber reinforced thermoplastic. In one or more aspects of these embodiments, the continuous fiber thermoplastic comprises woven fiber reinforced thermoplastic.

In one or more aspects of these embodiments, the continuous fiber thermoplastic composite is preformed to a shape corresponding to the gear teeth of the thermoplastic gear. In one or more aspects of these embodiments, the continuous fiber thermoplastic composite is preformed via at least one of compression molding or a stamping process. In one or more aspects of these embodiments, the thermoplastic gear comprises a neat thermoplastic or a discontinuous fiber thermoplastic or a continuous fiber thermoplastic.

In another embodiment, among others, a method comprises preforming a continuous fiber thermoplastic material to a shape corresponding to gear teeth of a thermoplastic gear, bending the continuous fiber thermoplastic material to correspond to a periphery of the thermoplastic gear, joining a first end of the continuous fiber thermoplastic material with a second end of the continuous fiber thermoplastic material to form a closed loop, and creating a hybrid gear by co-molding the continuous fiber thermoplastic material onto a periphery of the thermoplastic gear. In one or more aspects of these embodiments, the continuous fiber thermoplastic material is preformed via compression molding. In one or more aspects of these embodiments, the continuous fiber thermoplastic material is preformed via a stamping process. In one or more aspects of these embodiments, the first end and the second end are joined via ultrasonic welding. In one or more aspects of these embodiments, the first end and the second end are joined via heat fusion welding.

In one or more aspects of these embodiments, the thermoplastic gear comprises a neat thermoplastic or a discontinuous fiber thermoplastic or a continuous fiber thermoplastic. In one or more aspects of these embodiments, bonding forms between the thermoplastic gear and the continuous fiber thermoplastic material after cooling.

In another embodiment, among others, a hybrid gear comprises a thermoplastic gear and a unidirectional fiber composite tape shaped to correspond to gear teeth of the thermoplastic gear. The unidirectional fiber composted tape is co-molded onto a periphery of the thermoplastic gear corresponding to the gear teeth.

In one or more aspects of these embodiments, the thermoplastic gear comprises a neat thermoplastic. In one or more aspects of these embodiments, the thermoplastic gear comprises a discontinuous fiber thermoplastic composite. In one or more aspects of these embodiments, the thermoplastic gear comprises a continuous fiber thermoplastic composite. In one or more aspects of these embodiments, fibers of the unidirectional fiber composite tape are oriented along a length of the unidirectional fiber composite tape. In one or more aspects of these embodiments, the unidirectional fiber composite tape comprises at least one of carbon fiber or glass fiber.

Other devices, systems, methods, features, and advantages of the present disclosure will be or become apparent to one with skill in the art upon examination of the following drawings and detailed description. It is intended that all such additional devices, systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views

FIG. 4 is an example of a hot melt impregnation line that can be used to produce the continuous fiber thermoplastic material of the hybrid composite gear of FIG. 1 according to various embodiments of the present disclosure.

FIGS. 5A and 5B illustrate examples of the continuous fiber thermoplastic material of the hybrid composite gear of FIG. 1 according to various embodiments of the present disclosure. FIG. 5A shows a roll of the continuous fiber thermoplastic material. FIG. 5B shows a sheet of the continuous fiber thermoplastic material.

FIG. 8A illustrates and example of a flat continuous fiber thermoplastic material. FIG. 8B illustrates an example of continuous fiber thermoplastic material preformed to correspond to gear teeth of a gear. FIG. 8C illustrates an example of preformed continuous fiber thermoplastic material bent in a circular shape to correspond to a shape of a gear. FIG. 8D illustrates and example of the bent preformed continuous fiber thermoplastic material joined at a seam.

DETAILED DESCRIPTION

Figure 1:
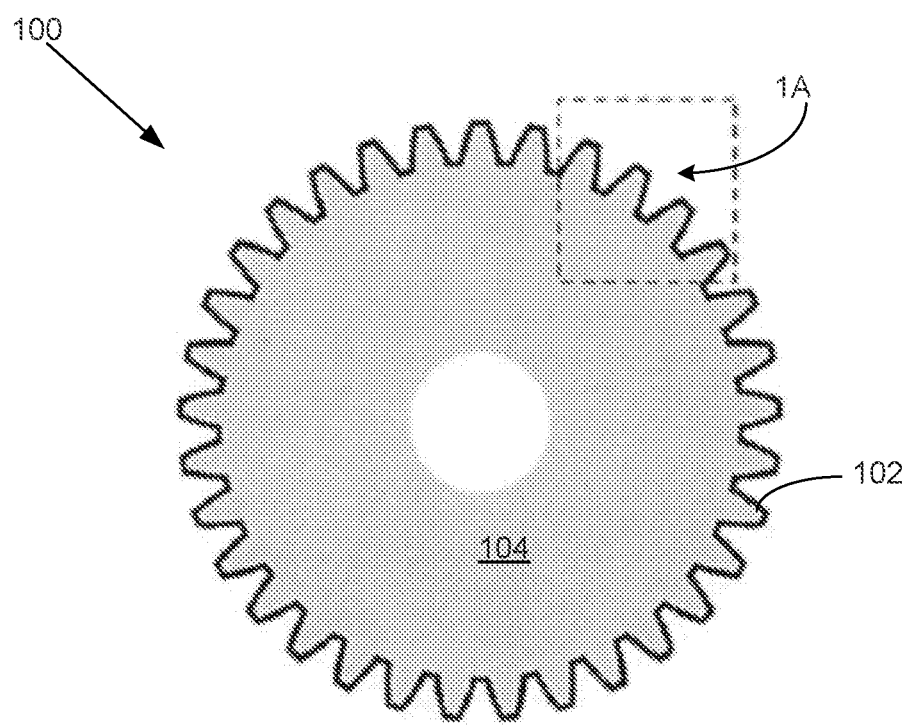
FIG. 1 is an example of a hybrid composite gear according to various embodiments of the present disclosure.

Disclosed herein are apparatuses and methods relating to a hybrid composite gear. The hybrid composite gear of the present disclosure comprises a continuous fiber thermoplastic material co-molded or bonded onto the periphery of a neat thermoplastic or discontinuous fiber thermoplastic composite gear. The hybrid composite gear of the present disclosure is lightweight, low-cost, and can be used for a variety of high-performance applications, such as, for example, transmission, aerospace, robotic arms, hydraulic pumps, aviation, and marine.

There has been a consistent increase in demand for gears in United States for the last decade. The demand was projected from twenty-three billion dollars in 2003 to thirty billion dollars in 2013 [1]. With the increasing effort in developing non-metallic gears that are lighter weight, have better damping (less noise) and are more resistance to corrosion, have lower coefficients of friction, and have an ability to run under non-lubricated conditions for applications such as automotive, gears made of neat plastics/discontinuous fiber plastics have gained tremendous interest and their demand has been projected to grow at a pace of more than 10% annually [2]

Various thermoplastics, such as, for example, nylon, Polyoxymethylene (POM), high density polyethylene (HDPE), and Teflon, have been increasingly used as gear materials because of their lightweight, excellent wear resistance, relative low cost, reduced noise and great processability[3]. Neat thermoplastics have relatively low strength and impact resistance. Discontinuous fibers, such as short and long fibers, have been used to reinforce the neat plastic to provide extra strength and wear resistance [4,5]. In spite of the added reinforcement, the discontinuous fiber plastic gears have been limited in low stress application while metal gears still remain to be the first and main choice for high performance applications.

Reference will now be made in detail to the description of the embodiments as illustrated in the drawings, wherein like reference numbers indicate like parts throughout the several views. This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

The following examples are put forth so as to provide those of ordinary skill in the art with a complete disclosure and description of how to perform the methods and use the structures disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification, and in the claims that follow, reference will be made to a number of terms that shall be defined to have the following meanings unless a contrary intention is apparent.

While embodiments of the present disclosure are described in connection with the corresponding text and figures, there is no intent to limit the disclosure to the embodiments in these descriptions. On the contrary, the intent is to cover all alternatives, modifications, and equivalents included with the spirit and scope of embodiments of the present disclosure.

The present disclosure relates to high-performance, light-weight, and low-cost fiber reinforced thermoplastic composite gears using a hybrid composite material solution. The hybrid composite gears of the present disclosure could be beneficial to all of the industries that intend to use light-weight gears in high performance applications (e.g., transmission, aerospace, robotic arms, hydraulic pumps, aviation, and marine).

Figure 1A:
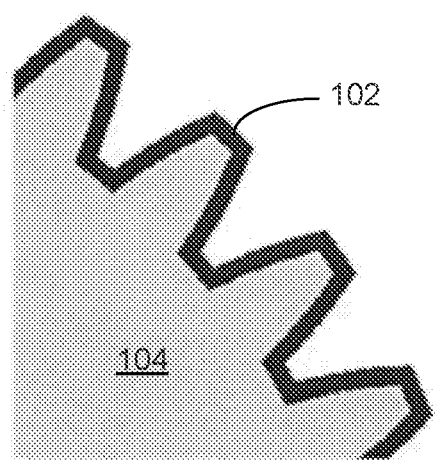
FIG. 1A is an example of an enlarged view of a portion of the hybrid composite gear of FIG. 1 according to various embodiments of the present disclosure.

FIG. 1 illustrates an example of a hybrid composite gear 100 according to various embodiments of the present disclosure. The hybrid composite gear 100 comprises a continuous fiber thermoplastic material 102 co-molded onto the periphery of a thermoplastic gear 104. FIG. 1A illustrates an example of an enlarged view of a section of the hybrid gear 100 of FIG. 1A to further illustrate the bond between continuous fiber thermoplastic material 102 and the thermoplastic gear 104. The continuous fiber thermoplastic material 102 can comprise unidirectional fiber reinforced thermoplastic, woven fiber reinforced thermoplastic, or any other continuous fiber thermoplastic material as can be appreciated. The thermoplastic gear 104 may comprise a spur gear, a bevel gear, a worm and worm wheel gear, a hypoid gear, a helical gear, a pinion gear, and/or any other type of gear. The material of the thermoplastic gear 104 can comprise neat thermoplastic or discontinuous fiber reinforced thermoplastic composites. Example thermoplastic includes nylon or polyamide, Polytetrafluoroethylene (PTFE), polyoxymethylene (POM), acrylonitrile butadiene styrene (ABS), polyphenylene sulfide, polyetherimide, poly ether ether ketone, poly ether ketone, polypropylene, polyethylene According to various embodiments, the continuous fiber thermoplastic material 102, such as, for example, a continuous fiber high-performance unidirectional fiber reinforced thermoplastic composite tape (uni-tape) is co-molded onto the periphery of the conventional neat thermoplastic/discontinuous fiber reinforced thermoplastic composite (neat plastic/discontinuous fiber plastic) gear 104 to increase the strength and wear resistance of the gears that are essential in high performance applications. The continuous fiber thermoplastic composite material 102 has excellent mechanical properties in the fiber direction and provides the strength and wear resistance needed at the highly stressed gear teeth area while the gear body is maintained at low stiffness. The hybrid composite material solution can enhance the gear properties with minimum change on the existing neat plastic/discontinuous fiber plastic gear processes such as injection molding and compression molding. The addition of the continuous fiber thermoplastic material 102 to the neat plastic/discontinuous fiber plastic gear 104 can provide the mechanical properties that conventional neat plastic/discontinuous fiber plastic gears lack while still keeping the gear weight low (e.g., the tape has only slightly higher density than neat plastic/discontinuous fiber plastic) and costs low (e.g., minimum additional material cost and processing cost).

Figure 2:
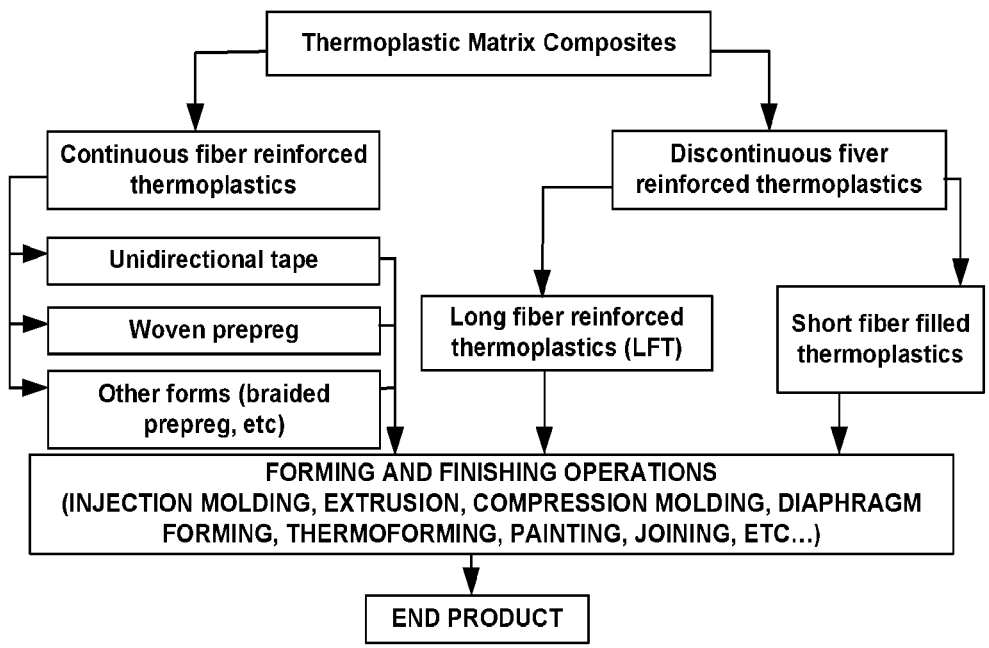
FIG. 2 is an example of a chart discussing thermoplastic matrix composites of the hybrid composite gear of FIG. 1 according to various embodiments of the present disclosure.

Thermoplastic matrix composites have two main categories, discontinuous and continuous fibers reinforced thermoplastics, as shown in FIG. 2. Discontinuous fibers in short-fiber thermoplastic composites (SFT) or long-fiber thermoplastic composites (LFT) are no more than about 25 mm (1") which make it suitable material for injection or compression molding gears 104. SFT or LFT pellets (e.g., fibers pre-impregnated with thermoplastics) with a typical length of 6-25 mm (¼-1 in) are melted in an extruder, for example. The melted extradite from the extruder is then injected into a gear mold or placed in a gear mold for compression molding. The SFT or LFT composite gear is formed and then demolded after cooling.

Figure 3:
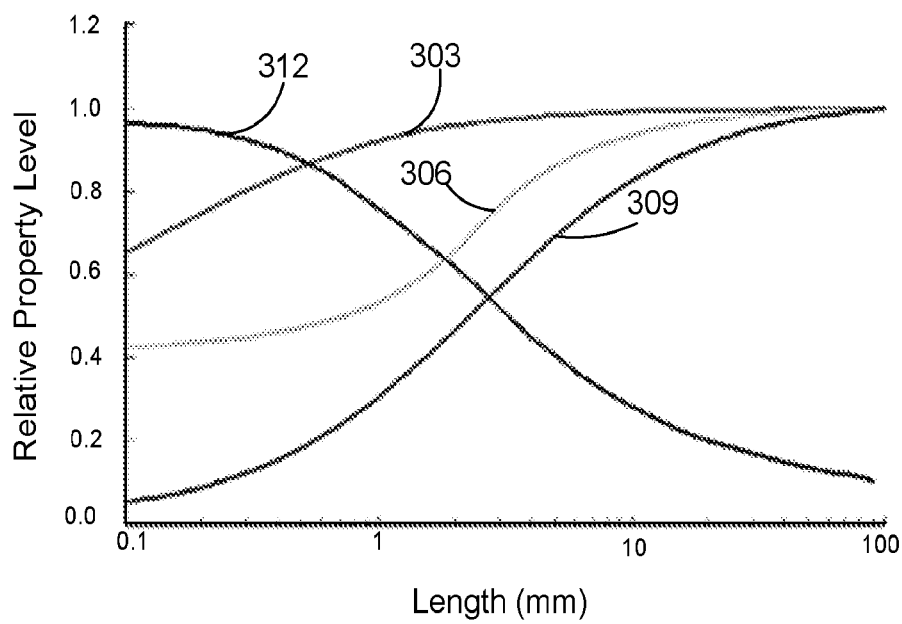
FIG. 3 is an example of a graphical representation of the properties and processibility in relation to fiber length of continuous fiber composites according to various embodiments of the present disclosure.

Continuous fiber reinforced thermoplastics possess excellent properties in their fiber direction. For example, unidirectional glass fiber reinforced nylon (uni-glass/nylon) composite has flexural strength of more than 1100 MPa (160 ksi) [6], higher than the flexural strength of some carbon steels and alloy steels that are used for high performance gears. However, processing continuous fiber composites can be much more challenging because the processibility decreases dramatically with the fiber length as shown in FIG. 3. FIG. 3 illustrates a graphical representation of the properties and processibility in relation to fiber length. Specifically, FIG. 3 illustrates the modulus 303, the strength 306, the impact 309, and the processibility 312 in relation to the fiber length.

The continuous fibers cannot be processed the same way the discontinuous fiber composites are processed. So far, there is only a handful effort to integrate the continuous fibers into gears for aviation application [7]. However, the low production rate and high-cost processing make it unaffordable for other applications such as automotive. The hybrid composite material solution for the hybrid composite gear 100 of the present disclosure can facilitate high production rate and low-cost manufacturing with minimum modification to the current gear manufacturing processes.

Wear resistance is another important criterion in addition to strength for materials used in gears. Studies have been previously carried out on the performance of composite materials in wear resistance. Fiber length and fiber content play an important role in the wear rate of the composite materials. When fiber length increases, wear resistance increases [8-9]. When the fiber length increases from 67 to 236 microns, the wear rate was significantly reduced by nearly three times. Longer fiber also decreases the coefficient of friction in comparison to shorter fibers [8]. With the fiber content increasing, wear resistance increases [10-11]. Continuous fiber composite shows great wear resistance. Carbon fiber composites have shown more than one magnitude higher wear resistance than neat plastics [12-13].

The uni-tape, for example, possesses greater wear resistance with the fibers aligned in either normal or parallel to the sliding. In experiments, the fiber orientation had a significant effect on both the coefficient of friction and the wear rate of uni-tape [14]. Composites with fibers parallel to the sliding direction have a lower friction coefficient and a significantly lower wear rate compared to the composites with the fibers transverse to the sliding direction [14-15]. According to various embodiments of the present disclosure, the continuous fiber thermoplastic material 102 comprises a uni-tape with fiber content ranging from about 20 up to about 70 volume percent. The uni-tape can be used on the gear periphery with all of the fibers orientated in the sliding direction to gain the benefit of reduced friction coefficient and increased wear resistance in addition to the enhanced strength.

According to various embodiments of the present disclosure, the continuous fiber thermoplastic material 102 may comprise glass fibers, carbon fibers, and/or any other type of fiber as can be appreciated. According to various embodiments, the continuous fiber thermoplastic material 102 can be produced with different fibers (e.g., glass or carbon) combining with various thermoplastic systems (e.g., nylon, polyethylene (PE), POM, etc.) in addition to developing discontinuous fiber reinforced thermoplastic composites [16-19].

FIG. 4 shows an example of a hot melt impregnation line that can be used to produce the continuous fiber thermoplastic material 102 according to various embodiments of the present disclosure. Fiber tows 400 pass through the hot impregnation die 402 and are impregnated with the molten plastic that is supplied by the extruder 404. The pre-impregnated fibers 400 form the continuous unidirectional fiber thermoplastic material 102 with all of the fibers oriented in one direction as shown in FIGS. 5A and 5B. The fiber orientation can be seen on the continuous unidirectional fiber thermoplastic material 102 shown in FIGS. 5A and 5B. FIG. 5A illustrates a roll of the continuous fiber thermoplastic material 102 according to various embodiments of the present disclosure. FIG. 5B illustrates an example of a sheet of the continuous fiber thermoplastic material 102 according to various embodiments of the present disclosure.

Figure 6:
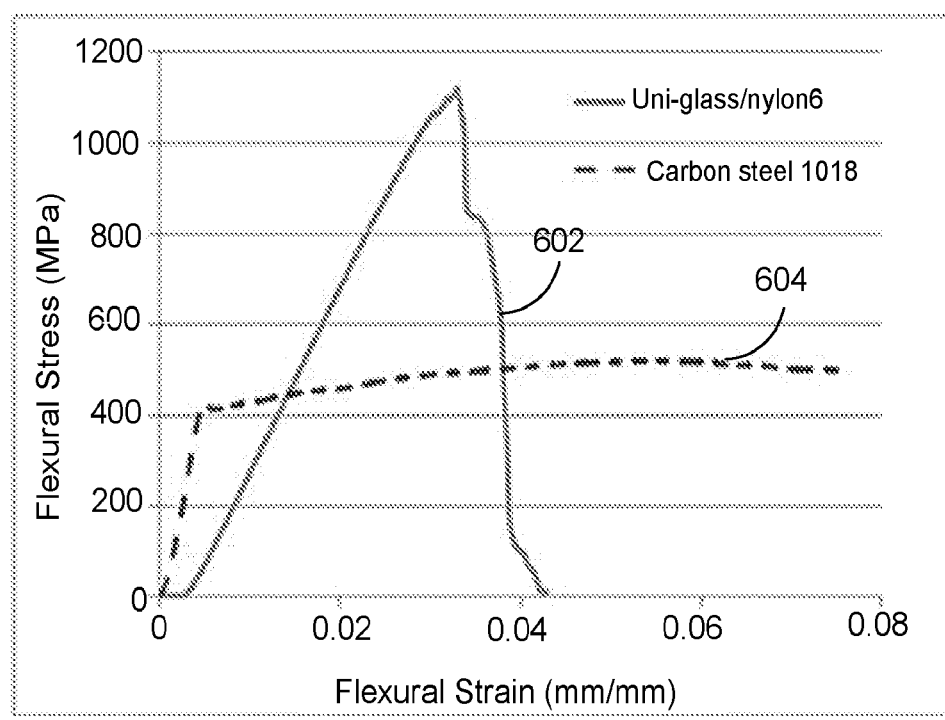
FIG. 6 is an example of a graphical representation showing the comparison between uni-glass/nylon6 and carbon steel according to various embodiments of the present disclosure.

Uni-tapes can possess excellent mechanical properties in the fiber direction. Testing on uni-glass/nylon6 composites show that the flexural strength reaches to more than 1100 MPa (160 ksi), which is higher than the flexural strength of some carbon steels and alloy steels that are used for high performance gears. The flexural modulus of the uni-glass/nylon6 composites is less than 40 GPa (5,800 ksi). FIG. 6 is an example of a graphical representation showing the comparison between uni-glass/nylon6 602 and carbon steel 604. The uni-glass/nylon6 tape 602 offers great strength with low stiffness. The low modulus (low E) and thin thickness (low moment of inertia I) result in low bending stiffness (EI). The low stiffness of the continuous fiber thermoplastic material 102 can enable the gear teeth of the gear 104 to be flexible and, therefore, share the loading among adjacent teeth during operation. The combination of high strength and low stiffness of unidirectional continuous fiber thermoplastic composites 102 can be suitable for high performance gear applications.

In other embodiments, the continuous fiber thermoplastic material 102 can comprise unidirectional carbon fiber thermoplastic composite tape. Although unidirectional carbon fiber composite has relatively high modulus that can reach to 100 GPa (14,500 ksi) [21] and can result in higher stiffness and lead to higher stress at the gear teeth, unidirectional carbon fiber composite has high strength and self-lubricating capability that could make it suitable for high performance gear material as well.

Figure 7:
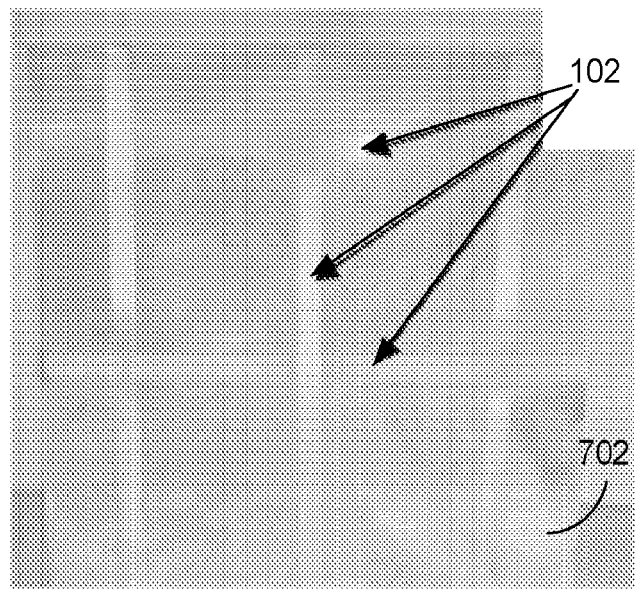
FIG. 7 illustrates an example of co-molded long-fiber thermoplastic composites (LFT) glass nylon702 with the continuous fiber thermoplastic material according to various embodiments of the present disclosure.

According to various embodiments of the present disclosure, the hybrid composite gear 100 comprises continuous fiber thermoplastic material 102 (e.g., unidirectional fiber thermoplastic composite tapes) co-molded with discontinuous fiber thermoplastic composites of the gear 104. The hybrid composite gear 100 can be manufactured via compression molding, injection molding, and/or any other type of molding as can be appreciated. FIG. 7 shows an example of co-molded LFT glass nylon702 with the continuous fiber thermoplastic material 102 (e.g., uni-glass/nylon composites). The uni-glass/nylon tapes were placed in a mold before LFT extradite was placed on top of the tapes and compression molded. The heat from the LFT extradite melted the matrix on the uni-glass/nylon tapes and provide bonding between the tapes and the LFT. Injection molding process has been used to produce a connecting rod with the unidirectional carbon fiber tape co-molded with discontinuous fiber composites.

According to various embodiments, the continuous fiber thermoplastic material 102 (e.g., unidirectional fiber composite tape) is co-molded with the neat plastics/discontinuous fiber composite of the gear 104 to form the hybrid composite gear 100. The complicated shape of the gear teeth makes it challenging to use only one step process to form the hybrid composite gear 100. According to various embodiments, the hybrid composite gear 100 is formed via a two-step manufacturing strategy. According to various embodiments, step 1 of the two-step manufacturing strategy comprises preforming and joining of the continuous fiber thermoplastic material 102 into complex teeth geometry. Step 2 of the two-step manufacturing strategy comprises co-molding the preformed and joined continuous fiber thermoplastic material 102 with neat plastic/discontinuous fiber composite of the gear 104 to form hybrid composite gear 100.

Figure 8A:
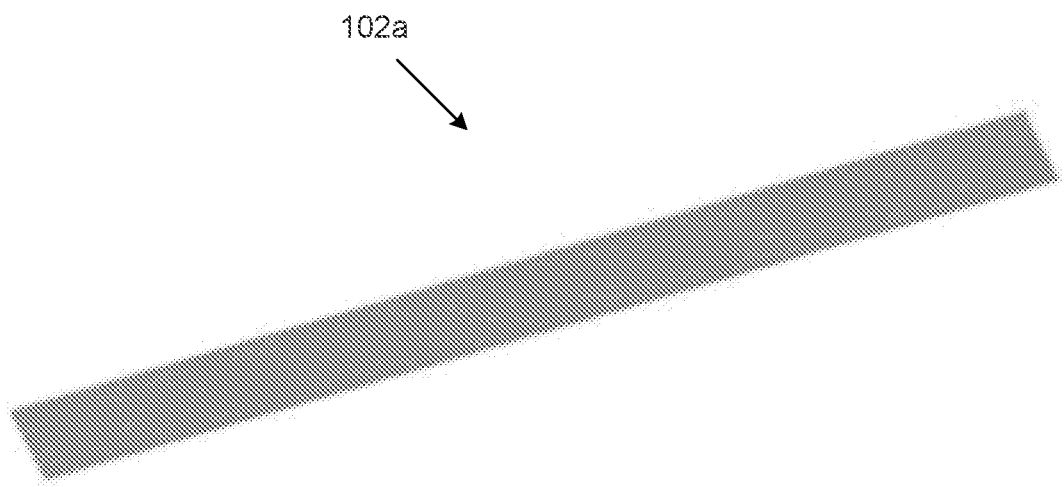
FIGS. 8A-8D illustrate examples of different forms of the continuous fiber thermoplastic material prior to pre-molding onto the thermoplastic gear of FIG. 1 according to various embodiments of the present disclosure.
Figure 8B:
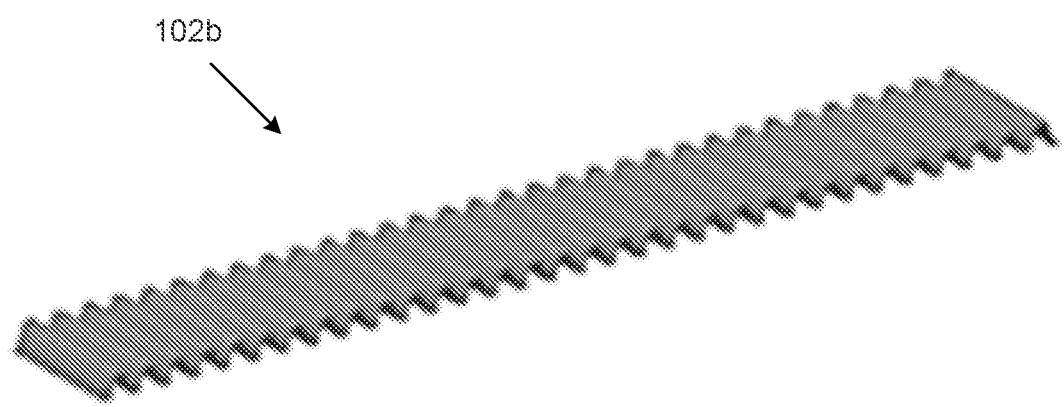
Figure 8C:
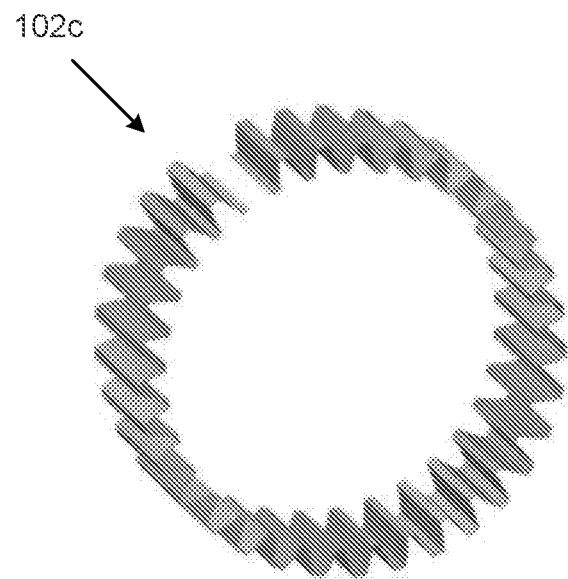
Figure 8D:
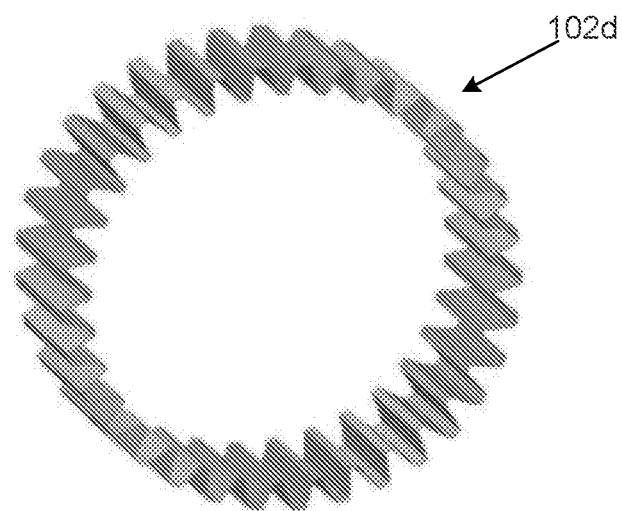

FIG. 1 and FIGS. 8A-8D will now be discussed with respect to the two-step strategy. FIGS. 8A-8D are examples of the continuous fiber thermoplastic material 102 (e.g., 102a, 102b, 102c, 102d) in various configurations in accordance to various embodiments of the present disclosure. Step 1 can involve preforming a flat sheet of unidirectional fiber reinforced thermoplastics 102a, as shown in FIG. 8A, using compression molding, stamping process, and/or any other type of process as can be appreciated to the shape of the gear teeth. FIG. 8B illustrates the continuous fiber thermoplastic material 102b preformed to the shape of the gear teeth according to various embodiments of the present disclosure. Next, as shown in FIG. 8C, the preformed continuous fiber thermoplastic material 102c is bent to the shape of the gear 104 to form a loop. The ends of the bent continuous fiber thermoplastic material 102 are then joined at a seam, as shown in FIG. 8D, to form a closed loop corresponding to the gear 104 for co-molding. Since thermoplastic can be re-melted, the joining can be readily realized using heat fusion welding, ultrasonic welding, and/or any other type of appropriate joinder processes. To ensure that the seam has minimum effect on the performance of the hybrid composite gear, finite element analysis (FEA) can be used to determine the low stress area on the gear and the seam can be deliberately located at the low stress area (e.g., such as the area on the gear addendum circle).

The joined preform continuous fiber thermoplastic material 102d is then inserted in an injection molding, compression molding, and/or other appropriate type of gear mold for co-molding. During the co-molding, molten thermoplastic in the neat plastic/discontinuous fiber composite melts the matrix of the continuous fiber thermoplastic material 102 (e.g., unidirectional fiber composite tape) and bonding forms to create the hybrid composite gear 100, as shown in FIG. 1.

According to various embodiments, the co-molding process of the present disclosure adds one additional processing step (Step 1) to the existing gear manufacturing process. The continuous fiber thermoplastic material 102 (e.g., uni-tape) molded onto the periphery of the gear teeth of the thermoplastic gear 104 provides the strength and wear resistance needed at the highly stressed gear teeth area while the gear body is maintained at low stiffness.

The bonding between the continuous fiber thermoplastic material 102 (e.g., uni-tape) and the neat plastic/discontinuous fiber plastic of the thermoplastic gear 104 ensure the good performance of the hybrid composite gear 100. Adequately bonding the continuous fiber thermoplastic material 102 (e.g., uni-tape) relies on the melting of its matrix by the molten neat plastic/discontinuous fiber plastic of the thermoplastic gear 104.

The dimensional consistency of thermoplastic gears especially neat plastic gear has been traditionally a concern. According to various embodiments, the hybrid composite gear 100 of the present disclosure, can comprise LFT and continuous fiber composites with less coefficient of thermal expansion (CTE) that ranges from about $20 \times 10^{-6}$ m/m° C. to about 80×10$^{-6}$ m/m° C. and better dimension consistency because of less thermal shrinkage during molding. Furthermore, uni-tape can contribute to better dimensional consistency because the uni-tape has minimum CTE in the fiber direction (10×10$^{-6}$ m/m° C. [21]), which is less than the CTE of some steels.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

While only a few embodiments of the present disclosure have been shown and described herein, it will become apparent to those skilled in the art that various modifications and changes can be made in the present disclosure without departing from the spirit and scope of the present disclosure. All such modification and changes coming within the scope of the appended claims are intended to be carried out thereby.

REFERENCES

[1] World Gears to 2013—Industry Market Research, Market Share, Market Size, Sales, Demand Forecast, Company Profiles, Industry Trends, Freedonian survey, 2010.
[2] McGuinn, Jack. Plastic Gears—A Growing Industry Still Seeking Respect—Gear Technology, March/April 2007
[3] Gupta, Amarjeet. Application of Different Thermoplastic Gears in the Gearbox of Moped. International Journal for Engineering Applications and Technology. ISSN: 2321-8134 Issue 2, (2013) 58-62.
[4] GE Plastics, A Guide to Plastic Gearing, PLA-749-REV3-0806, http://kbam.geampod.com/kbam/reflection/assets/thumbnail/7106_8.pdf, accessed in September 2015.
[5] Khedkar, Jaydeep, Ioan Negulescu, and Efstathios, Meletis. Sliding wear behavior of PTFE composites. Wear 252 (2002): 361-369.
[6] Ning, Haibin. Testing of Unidirectional Fiber Composites. Internal report, 2015.
[7] Black, Sara, New Aerocomposites Niche: Helicopter Transmission Gears. Composites World, 2015.
[8] Abdelbary, Ahmed. Wear of polymers and composites. Woodhead Publishing, 2015.
[9] Zhang, Hui, et al. Effect of Fiber Length on the Wear Resistance of Short Carbon Fiber Reinforced Epoxy Composites. Composites science and technology 67 (2007): 222-230.
[10] Friedrich, Klaus, ed. Advances in Composite Tribology. Elsevier, 2012.
[11] Xian, Guijun, and Zhong, Zhang. Sliding Wear of Polyetherimide Matrix Composites: I. Influence of Short Carbon Fibre Reinforcement. Wear 258 (2005): 776-782.
[12] Friedrich, Klaus, and Reinicke, Petra. Friction and Wear of Polymer-Based Composites. Mechanics of Composite Materials 34 (1998): 503-514.
[13] Bijwe, Jayashree, et al. Abrasive Wear Performance of Carbon Fabric PEI Composites: Influence of Content and Orientation. Tribology International 40 (2007): 844-854.
[14] Cheng, Billy, et al. A Study of the Coefficient of Friction and Wear of Unidirectional and Woven Carbon Fiber/Epoxy Composite in Severe Abrasive Conditions. 10th International Conference on Composite Science and Technology (2015).
[15] Friedrich, Klaus, et al, Wear and Friction of a Unidirectional Carbon Fiber-Glass Matrix Composite against Various Counterparts. Wear 162 (1993): 1103-1113.
[16] Ning, Haibin, et al. Thermoplastic Sandwich Structure Design and Manufacturing for The Body Panel of Mass Transit Vehicle. Composite Structures 80 (2007): 82-91.
[17] Ning, Haibin, et al. Design and Development of Thermoplastic Composite Roof Door for Mass Transit Bus. Materials & Design 30 (2009): 983-991.
[18] Vaidya, Uday, Pillay, Selvum, Ning, Haibin, and Thattai, Balaji. Modular Shelters Comprising Composite Panels. U.S. patent application Ser. No. 14/383,934, 2013.
[19] Vaidya, Uday, Andrews, Barry J., Pillay, Selvum, and Ning, Haibin. Long Fiber Thermoplastic Thin-Walled Aeroshells for Missile Applications and Methods of Manufacture. U.S. patent 20, 150, 253, 116, 2015.
[20] http://www.tencate.com, accessed in October 2015.
[21] http://www.matweb.com/search/datasheet.aspx?matguid=f00af61d6c4942d8b57 d1760655e02b5&ckck=1, accessed in October 2015.

We claim at least the following:

1. A method, comprising:
preforming a continuous fiber thermoplastic material to a shape corresponding to gear teeth of a thermoplastic gear;
bending the continuous fiber thermoplastic material to correspond to a periphery of the thermoplastic gear;
joining a first end of the continuous fiber thermoplastic material with a second end of the continuous fiber thermoplastic material to form a closed loop; and
creating a hybrid gear by co-molding the continuous fiber thermoplastic material onto a periphery of the thermoplastic gear.

2. The method of claim 1, wherein the continuous fiber thermoplastic material is preformed via compression molding.

3. The method of claim 1, wherein the continuous fiber thermoplastic material is preformed via a stamping process.

4. The method of claim 1, wherein the first end and the second end are joined via ultrasonic welding.

5. The method of claim 1 wherein the first end and the second end are joined via heat fusion welding.

6. The method of claim 1, wherein the thermoplastic gear comprises neat thermoplastic, a discontinuous fiber thermoplastic, or a continuous fiber thermoplastic.

7. The method of claim 1, wherein bonding forms between the thermoplastic gear and the continuous fiber thermoplastic material after cooling.

* * * * *